US012621640B2

(12) United States Patent
Miura et al.

(10) Patent No.: US 12,621,640 B2
(45) Date of Patent: May 5, 2026

(54) INDUSTRIAL MACHINE AND COMMUNICATION SYSTEM OF INDUSTRIAL MACHINE

(71) Applicant: KUBOTA CORPORATION, Osaka (JP)

(72) Inventors: Keisuke Miura, Osaka (JP); Ryo Ikeda, Osaka (JP); Yoshihito Iida, Osaka (JP); Kenji Ishihara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 306 days.

(21) Appl. No.: 18/529,120

(22) Filed: Dec. 5, 2023

(65) Prior Publication Data

US 2024/0214789 A1 Jun. 27, 2024

(30) Foreign Application Priority Data

Dec. 26, 2022 (JP) ................................. 2022-208350

(51) Int. Cl.
*H04W 4/48* (2018.01)
*H04W 92/02* (2009.01)

(52) U.S. Cl.
CPC .............. *H04W 4/48* (2018.02); *H04W 92/02* (2013.01)

(58) Field of Classification Search
CPC ........ H04W 4/48; H04W 92/02; G07C 5/008; H04L 67/12
See application file for complete search history.

(56) References Cited

U.S. PATENT DOCUMENTS

2007/0073457 A1 3/2007 Lee
2011/0153652 A1* 6/2011 Yun ........................ G07C 5/008
707/769

(Continued)

FOREIGN PATENT DOCUMENTS

JP 2007-95049 A 4/2007
JP 2011-74639 A 4/2011
JP 2022-148921 A 10/2022

OTHER PUBLICATIONS

European Search Report Dated May 3, 2024 issued in co-pending European family member application No. EP 23 21 6470 .

(Continued)

*Primary Examiner* — Mohammad S Anwar
(74) *Attorney, Agent, or Firm* — Greenblum & Bernstein, P.L.C.

(57) ABSTRACT

A communication system of an industrial machine includes an in-vehicle network, an information communication network, and a communication device of an information collecting unit. The in-vehicle network N1 performs data communication in a plurality of electronic devices 7 mounted on the industrial machine (backhoe 1). The information communication network is an external network of the backhoe and is a network different from the in-vehicle network. The communication device connects the in-vehicle network to the information communication network. The communication device 30C transmits the in-vehicle data D when data communication is performed by the plurality of electronic devices 7 in the in-vehicle network N1 to the information communication network N. As a result, the in-vehicle data configured via the in-vehicle network in the backhoe can be transmitted without any change to the information communication network outside the backhoe.

5 Claims, 8 Drawing Sheets

(56)  References Cited

U.S. PATENT DOCUMENTS

| 2012/0209634 A1 |   | 8/2012 | Ling et al. |
| 2019/0056925 A1 | * | 2/2019 | Komano ............. H04L 41/0866 |
| 2023/0323632 A1 |   | 10/2023 | Saegusa et al. |
| 2023/0333549 A1 |   | 10/2023 | Okumura et al. |

OTHER PUBLICATIONS

Office Action, dated Aug. 19, 2025 in Japanese family member application No. No. 2022-208350, with machine English language translation thereof.

* cited by examiner

FIG. 1

TERMINAL DEVICE 40

COMMUNICATION PORTION 40D

DATA REQUEST PORTION 40A

DATA SETTING PORTION 40B

DATA PROCESSING UNIT 40C

DISPLAY DEVICE 41

INDUSTRIAL MACHINE AND COMMUNICATION SYSTEM OF INDUSTRIAL MACHINE

CROSS-REFERENCE TO RELATED APPLICATION

This application is based upon and claims the benefit of priority from Japanese Patent Application No. 2022-208350 filed on Dec. 26, 2022 in Japan, the entire contents of which are incorporated herein by reference.

TECHNICAL FIELD

The present invention relates to, for example, an industrial machine such as an agricultural machine or a construction machine, and a communication system of the industrial machine.

RELATED ART

Conventionally, as a system for diagnosing a failure of a work machine, there is a failure diagnosis support system in JP 2011-74639 A (Claim 1, paragraph 0022, and the like). In the failure diagnosis support system in JP 2011-74639 A (Claim 1, paragraph 0022, and the like), an operation status of each part of the work machine is converted into an image. The image is read and transmitted as an operation status to an external terminal via a network. In a case where the terminal receives the operation status, a failure is automatically estimated on the basis of the operation status and a repair record.

In the system in JP 2011-74639 A (Claim 1, paragraph 0022, and the like), operation information of the work machine is converted into an image of a QR code (registered trademark) at a timing at which diagnosis is requested. An operation status is transmitted to an external terminal by reading the image. On the other hand, in a case where only the operation information at the timing at which diagnosis is required is used, an amount of information for diagnosis may be reduced, and it is difficult to easily and accurately execute diagnosis. As information to be transmitted to the terminal, for example, a continuous temporal change at a level at which a change tendency can be appropriately analyzed is preferable in many cases. JP 2011-74639 A (Claim 1, paragraph 0022, and the like) does not disclose a technique related to this viewpoint. As described above, there is a demand for a technique for easily and accurately executing diagnosis of a part of an industrial machine at a place remote from the industrial machine.

Therefore, in view of the above problems, an object of the present invention is to provide an industrial machine and a communication system of the industrial machine capable of easily and accurately performing diagnosis of a part of the industrial machine at a place remote from the industrial machine.

SUMMARY

The technical means of the present invention for solving this technical problem is characterized by the following points. A communication system of an industrial machine according to the present invention includes: an in-vehicle network that performs data communication between a plurality of devices mounted on an industrial machine; an information communication network that is an external network of the industrial machine and is different from the in-vehicle network; and a communication device that connects the in-vehicle network to the information communication network. The communication device transmits, to the information communication network, in-vehicle data when the data communication is performed between the plurality of devices in the in-vehicle network.

The communication system of an industrial machine according to the present invention, further includes: a terminal device that is connectable to the information communication network. The communication device transmits the in-vehicle data to the terminal device via the information communication network, and the terminal device processes the in-vehicle data transmitted by the communication device into visualized data.

The communication system of an industrial machine according to the present invention, further includes: a display device that displays the visualized data processed by the terminal device.

The communication system of an industrial machine according to the present invention, further includes: a storage device that temporarily stores the in-vehicle data before the communication device transmits the in-vehicle data to the information communication network. The terminal device requests the communication device to transmit the in-vehicle data to the terminal device via the information communication network, and the communication device transmits the in-vehicle data stored in the storage device to the terminal device via the information communication network in response to a request from the terminal device.

The communication system of an industrial machine according to the present invention, further includes: a storage device that temporarily stores the in-vehicle data before the communication device transmits the in-vehicle data to the information communication network. The communication device transmits the in-vehicle data stored in the storage device to the terminal device via the information communication network in a case where a predetermined transmission start condition occurs.

The communication system of an industrial machine according to the present invention, further includes: a storage device that temporarily stores the in-vehicle data before the communication device transmits the in-vehicle data to the information communication network. A range of in-vehicle data to be transmitted to the information communication network by the communication device among pieces of the in-vehicle data stored in the storage device is changeable by the terminal device.

An industrial machine according to the present invention includes: an in-vehicle network that performs data communication between a plurality of devices mounted on the industrial machine; and a communication device that connects the in-vehicle network to an information communication network that is an external network of the industrial machine and is different from the in-vehicle network. The communication device transmits, to the information communication network, in-vehicle data when the data communication is performed between the plurality of devices in the in-vehicle network.

According to the present invention, it is possible to easily and accurately perform diagnosis of a part of the industrial machine at a place remote from the industrial machine.

BRIEF DESCRIPTION OF DRAWINGS

FIG. 1 is an overall diagram illustrating a communication system of an industrial machine (backhoe) according to a first embodiment of the present invention, and is a functional block diagram of the backhoe;

DETAILED DESCRIPTION

Hereinafter, embodiments of the present invention will be described with reference to the drawings.

First Embodiment

<Communication System of Industrial Machine>

Figure 8:
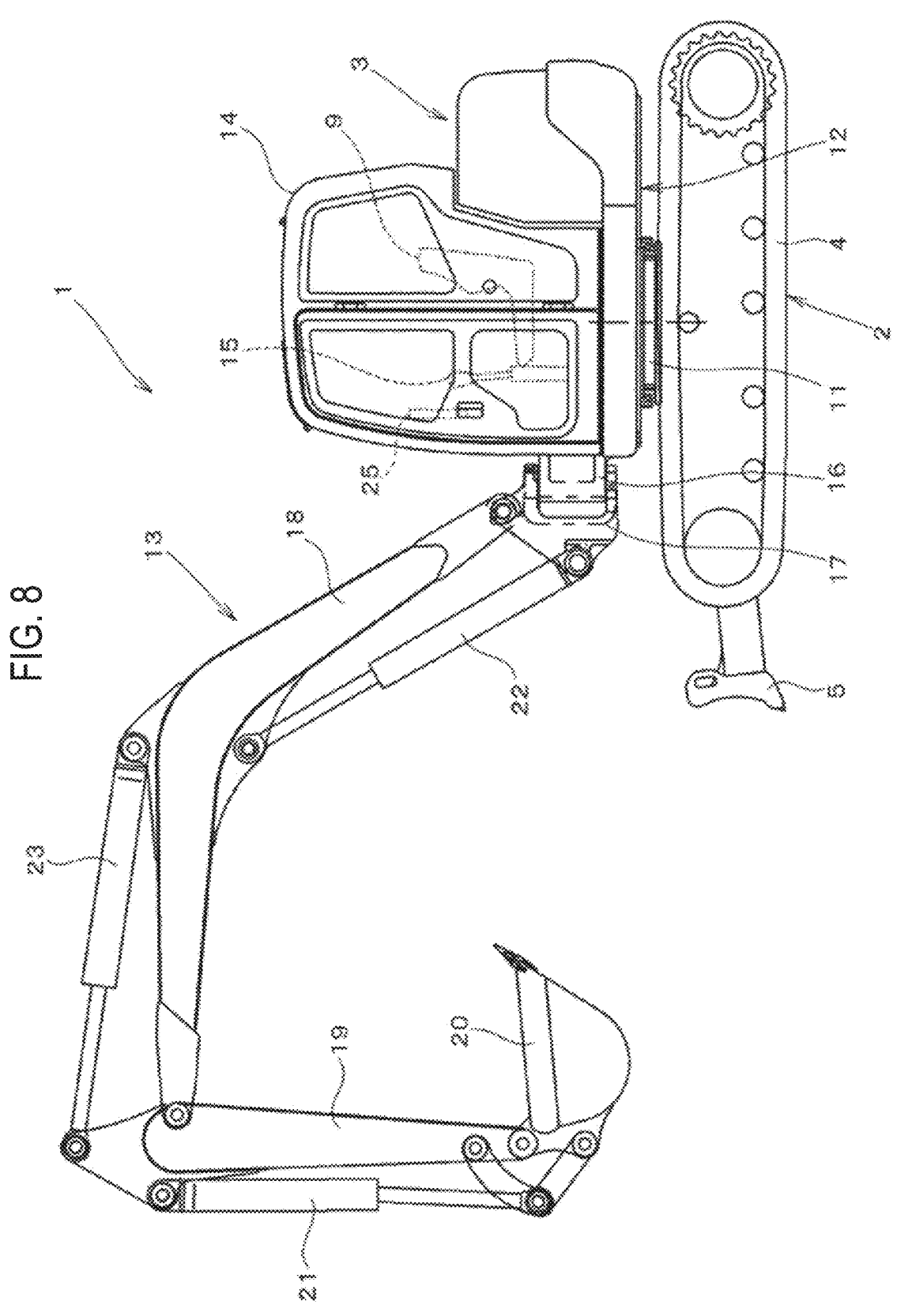
FIG. 8 is a side view of the industrial machine (backhoe) illustrated in FIG. 1.

FIG. 8 illustrates an example of an industrial machine in a communication system S of the industrial machine of the present invention. In the present embodiment, the industrial machine will be described as a backhoe 1 that is a turning work machine. Note that an industrial machine applied to the communication system S of the industrial machine of the present invention is not limited to the industrial machine illustrated in this embodiment. Instead of the backhoe 1, the industrial machine may be, for example, a construction machine such as a loader, or an agricultural machine such as a tractor, a combine harvester, or a rice transplanter.

The backhoe 1 includes a lower traveling device 2 and an upper turning body 3. The traveling device 2 includes a pair of left and right traveling bodies 4 having a cover band. As the traveling device 2, a crawler traveling device in which each traveling body 4 is driven by a traveling motor M is adopted. A dozer 5 is provided at a front portion of the traveling device 2.

The turning body 3 includes a turning base 12 and a work device 13 provided at a front portion of the turning base 12. The turning base 12 is supported on the traveling device 2 via a turning bearing 11 to be turnable laterally about a vertical turning axis. An engine, a radiator, a driver's seat 9, a fuel tank, a hydraulic oil tank, and the like are provided on the turning base 12. A display device 25 that displays various types of information related to the backhoe 1 is provided around the driver's seat 9. The driver's seat 9 is surrounded by a cabin 14 provided on the turning base 12.

The work device 13 includes a swing bracket 17, a boom 18, an arm 19, and a bucket 20. The swing bracket 17 is supported by a support bracket 16 to be swingable laterally about a vertical axis. The support bracket 16 is provided at the front portion of the turning base 12 to be offset slightly rightward from the central portion in the left-right direction. The swing bracket 17 swings through extension and contraction of a swing cylinder provided in the turning base 12.

The base side of the boom 18 is pivotally attached to the swing bracket 17 to be rotatable about the axis in the left-right direction, and the boom 18 is supported to be vertically swingable. The boom 18 swings through extension and contraction of a boom cylinder 22 interposed between the boom 18 and the swing bracket 17. A base side of an arm 19 is pivotally attached to a distal end side of the boom 18 to be rotatable about the axis in the left-right direction, and the arm 19 is supported to be swingable back and forth.

The arm 19 swings through extension and contraction of an arm cylinder 23 interposed between the arm 19 and the boom 18. On the distal end side of the arm 19, a bucket 20 is provided to be capable of performing a squeeze dumping operation. The bucket 20 executes the squeeze dumping operation through extension and contraction of a bucket cylinder 21 interposed between the bucket 20 and the arm 19.

In the work device 13, other work tools (spare attachments) can be mounted instead of or in addition to the bucket 20. Examples of the other work tools (spare attachments) include work tools that can be driven by a hydraulic actuator, such as a hydraulic breaker, a hydraulic crusher, an angle bloom, an earth auger, a pallet fork, a sweeper, a mower, and a snow blower.

Figure 1:
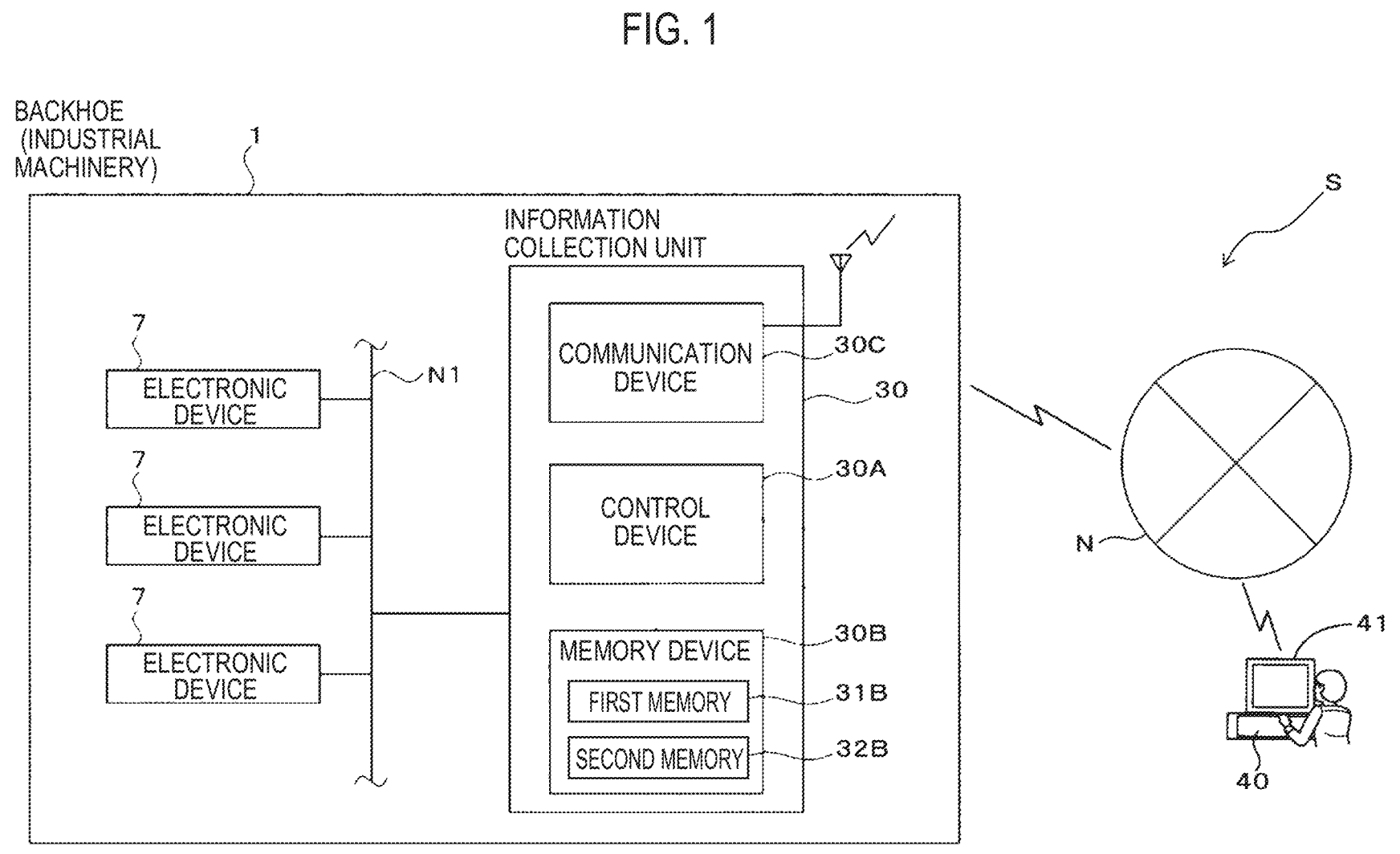

As illustrated in FIG. 1, the backhoe 1 includes a plurality of electronic devices 7, an in-vehicle network N1, and an information collecting unit 30. The electronic device 7 may be a sensor or the like that acquires a state or an operating status of a part configuring the industrial machine. In the present embodiment, the electronic device 7 is a rotational speed sensor, a fuel sensor, a water temperature sensor, a hydraulic sensor, a potentiometer, or the like, but is not limited thereto.

The rotation speed sensor is provided in the engine of the backhoe 1 and transmits an output signal corresponding to an engine rotation speed. The fuel sensor is provided in the fuel tank of the backhoe 1 and transmits an output signal corresponding to a remaining amount of fuel. The water temperature sensor is provided in a cooling water circuit connecting the engine and the radiator of the backhoe 1, and transmits an output signal corresponding to a water temperature. The hydraulic sensor is provided in the hydraulic oil tank and the hydraulic cylinder of the backhoe 1, and transmits an output signal corresponding to the presence or absence of oil or a cylinder pressure. The potentiometer is provided at a predetermined part of the work device 13, and transmits an output signal corresponding to a rotation angle of the boom 18, the arm 19, or the bucket 20.

The in-vehicle network N1 performs data communication in the plurality of electronic devices 7 mounted on the backhoe 1 (industrial machine). The in-vehicle network N1 is connected to the electronic devices 7 and the information collecting unit 30. Therefore, each output signal transmitted from the electronic device 7 is input to the information collecting unit 30 via the in-vehicle network N1. As the in-vehicle network N1, for example, a protocol such as CAN, Ethernet (registered trademark), or BroadR-Reach (registered trademark) may be used, but the in-vehicle network N1 is not limited thereto.

The information collecting unit 30 samples various input output signals at a sampling cycle (for example, 10 to 30 milliseconds) on the order of milliseconds. The output signal from the electronic device 7 sampled by the information collecting unit 30 is configured as in-vehicle data. In the present embodiment, the in-vehicle data is a graph corresponding to an output signal from each electronic device 7, and corresponds to a graph indicating a continuous temporal change for each sampling cycle (refer to FIG. 4).

Figure 2:
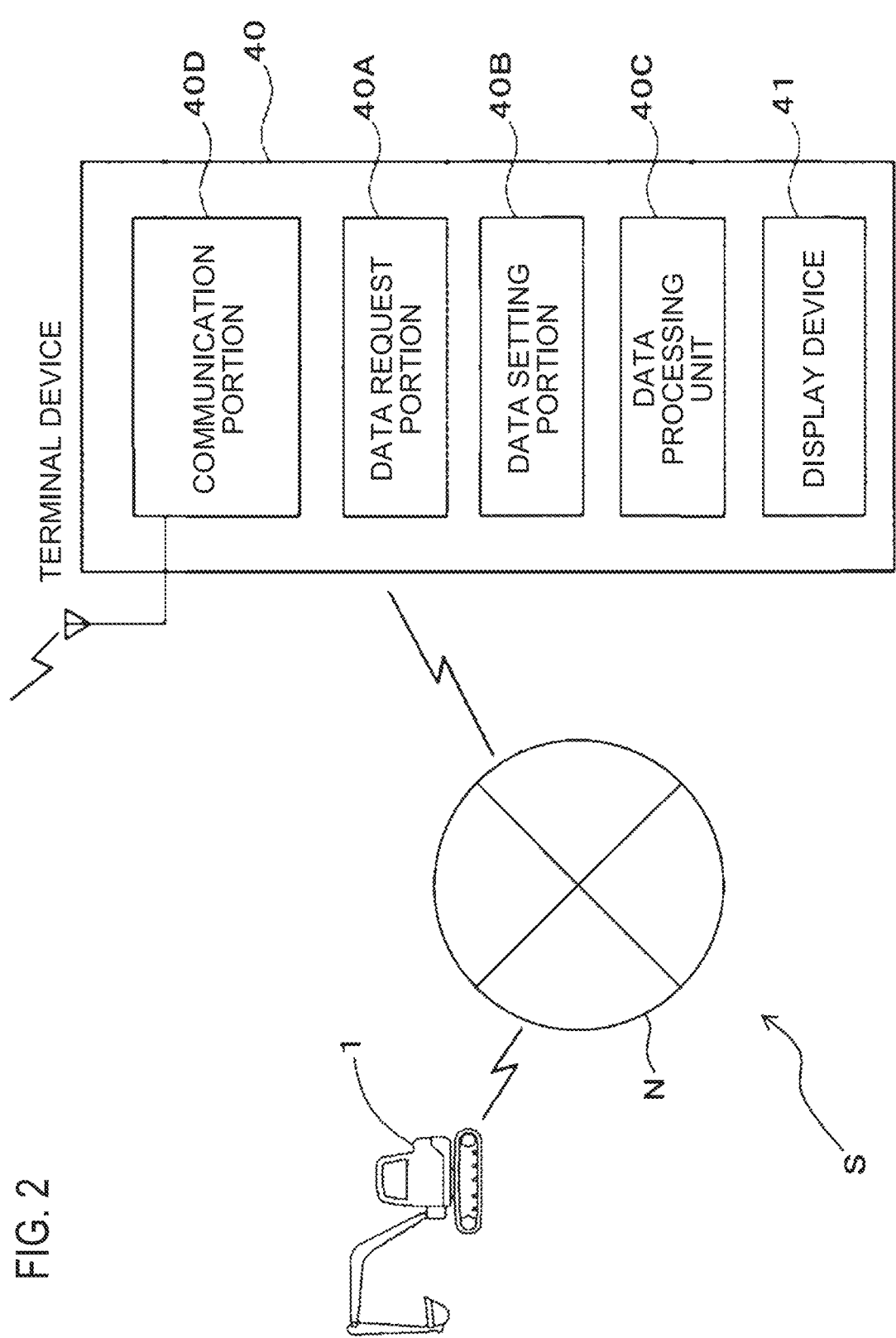
FIG. 2 is an overall diagram illustrating the communication system of the industrial machine (backhoe) according to the first embodiment of the present invention, and is a functional block diagram of a terminal device.

As illustrated in FIGS. 1 and 2, the communication system S includes the information collecting unit 30 (a communication device 30C thereof), the in-vehicle network N1, an information communication network N, and a terminal device 40. In the communication system S, the in-vehicle data configured as described above is transmitted from the information collecting unit 30 to the terminal device 40 via the information communication network N. In the present embodiment, the in-vehicle data of the information collecting unit 30 is transmitted without any change in response to a request from the terminal device 40.

Here, "transmitted without any change" indicates that when in-vehicle data is transmitted from the information collecting unit 30 to the information communication network N, the in-vehicle data is transmitted without being changed, except that processing/calculation for communication (for example, processing/calculation for configuring a header, a packet, and the like) is performed. At least a part of the in-vehicle data transmitted from the information collecting unit 30 may be "transmitted without any change".

In order to achieve the above-described transmission of the in-vehicle data, as illustrated in FIG. 1, the information collecting unit 30 includes a control device 30A, a storage device 30B, and a communication device 30C. The control device 30A includes a CPU and the like, and executes predetermined control on the basis of a program. More specifically, the control device 30A performs a process of sampling an output signal from the electronic device 7 input to the information collecting unit 30 and storing the output signal in the storage device 30B as in-vehicle data. The control device 30A executes a process of switching storage parts of the in-vehicle data in the storage device 30B. The control device 30A instructs the communication device 30C to transmit the in-vehicle data in the storage device 30B in response to a request from the terminal device 40.

The storage device 30B temporarily stores the in-vehicle data before the communication device 30C transmits the in-vehicle data to the information communication network N. The storage device 30B includes a first storage portion 31B and a second storage portion 32B. The first storage portion 31B includes a volatile memory such as a RAM. The second storage portion 32B includes a nonvolatile memory such as an EEPROM.

In the storage device 30B, storage of the in-vehicle data in the first storage portion 31B and storage of the in-vehicle data in the second storage portion 32B can be switched. In the present embodiment, in a case where the control device 30A executes the storage of the in-vehicle data in the first storage portion 31B, the storage of the in-vehicle data in the second storage portion 32B is restricted. In a case where the control device 30A performs switching and the storage of the in-vehicle data in the second storage portion 32B is executed, the storage of the in-vehicle data in the first storage portion 31B is restricted.

The communication device 30C connects the in-vehicle network N1 and the information communication network N.

The information communication network N is an external network of the backhoe 1 and is a network different from the in-vehicle network. The information communication network N is, for example, a mobile phone communication network or a data communication network such as LTE (registered trademark) or a fourth or fifth generation communication system. The communication device 30C transmits in-vehicle data when data communication is performed by the plurality of electronic devices 7 in the in-vehicle network N1 to the information communication network N through wireless communication.

The communication device 30C transmits the in-vehicle data stored in the storage device 30B to the terminal device 40 via the information communication network N in response to a request from the terminal device 40. In the present embodiment, in a case where it is determined that there is a request from the terminal device 40, the respective pieces of in-vehicle data stored in the first storage portion 31B and the second storage portion 32B are transmitted. An aspect of switching storage parts of the in-vehicle data and transmitting the in-vehicle data will be described in detail later.

As illustrated in FIG. 2, the terminal device 40 includes a data request portion 40A, a data setting portion 40B, a data processing portion 40C, a communication portion 40D, and a display device 41. In the present embodiment, the terminal device 40 is an installation type server connectable to the information communication network N, but may be, for example, a portable computer such as a smartphone, a tablet PC, or a laptop PC. The terminal device 40 is located at a place remote from the backhoe 1, and may be installed in, for example, a rental company, a repair company, or a manufacturer.

The data request portion 40A, the data setting portion 40B, and the data processing portion 40C include an electric/electronic circuit, a CPU, a program, and the like. The data request portion 40A requests the information collecting unit 30 to transmit the in-vehicle data to the terminal device 40 via the information communication network N. The data setting portion 40B sets a range of the in-vehicle data transmitted from the communication device 30C of the information collecting unit 30 via the information communication network N. As a result, a range of the in-vehicle data to be transmitted to the information communication network N by the communication device 30C among the pieces of in-vehicle data stored in the storage device 30B can be changed. The data processing portion 40C executes a process of processing the in-vehicle data transmitted from the communication device 30C of the information collecting unit 30 into visualized data.

Figure 3:
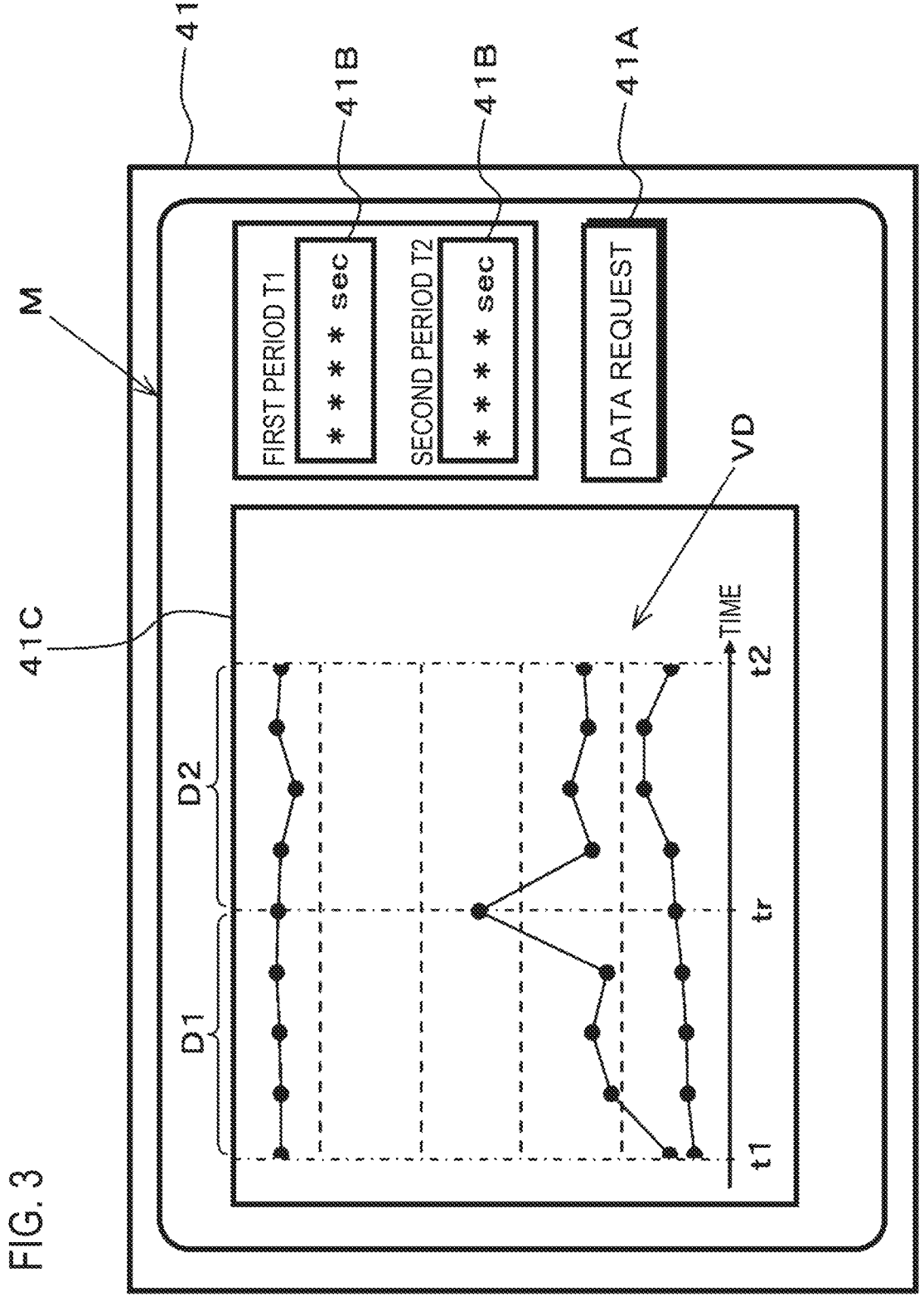
FIG. 3 is a diagram illustrating an example of a screen displayed on a display device illustrated in FIG. 1.

For example, in a case where the terminal device 40 is connected to the information collecting unit 30 via the information communication network N and a predetermined operation is performed in the terminal device 40, a screen M may be displayed on the display device 41 as illustrated in FIG. 3. The screen M includes a data range input field 41B, a data request button 41A, and a data display part 41C. The data range input field 41B is configured such that the first period T1 and the second period T2 can be input as numerical values (for example, the number of seconds or the like). Input to the data range input field 41B and an operation on the data request button 41A are executed by using a user interface of the terminal device 40.

The first period T1 corresponds to a period from a request timing tr of the in-vehicle data to a timing t1 before the request timing tr. The second period T2 corresponds to a period from the request timing tr of the in-vehicle data to a timing t2 after the request timing tr. The first period T1 and the second period T2 (that is, timings t1 and t2) are variable by adjusting input numerical values. The first period T1 and the second period T2 are adjusted to be longer than a sampling cycle of the information collecting unit 30. The request timing tr is a timing at which the data request button 41A is operated and the terminal device 40 instructs the information collecting unit 30 to request the in-vehicle data.

In the screen M, in a case where the first period T1 and the second period T2 are input to the data range input field 41B and then the data request button 41A is operated, the data setting portion 40B sets a range of the in-vehicle data, and the data request portion 40A requests the information collecting unit 30 to transmit the in-vehicle data in the set range. The range of the set in-vehicle data is a range corresponding to the first period T1 and the second period T2 with the request timing tr interposed therebetween, in other words, a range from the timing t1 to the timing t2 (refer to FIG. 4).

In a case where the in-vehicle data is transmitted from the information collecting unit 30 and reaches the terminal device 40, the in-vehicle data is processed into visualized data VD by the data processing portion 40C and displayed in the data display part 41C of the screen M. In the present embodiment, the visualized data VD is a graph corresponding to an output signal from each electronic device 7, and is a graph indicating a continuous temporal change for each sampling cycle. More specifically, in a case where in-vehicle data D1 in the range corresponding to the first period T1 and in-vehicle data D2 in the range corresponding to the second period T2 reach the terminal device 40, the in-vehicle data D1 and the in-vehicle data D2 are combined by the data processing portion 40C, and a graph in the range from the timing t1 to the timing t2 is displayed as the visualized data VD (refer to FIG. 3).

The display device 41 is, for example, a monitor connected to the terminal device 40, and displays the visualized data VD processed by the data processing portion 40C via the screen M. In the display device 41, the displayed visualized data VD can be visually recognized by a user, and a change tendency or the like of the visualized data VD can be analyzed.

The communication portion 40D connects the information communication network N to the terminal device 40. The communication portion 40D receives the in-vehicle data transmitted from the information collecting unit 30. The communication portion 40D transmits the request for the in-vehicle data for which the instruction is given by the data request portion 40A and the range of the in-vehicle data set by the data setting portion 40B to the information communication network N through wireless communication. The request for the in-vehicle data and the range of the in-vehicle data are transmitted to the information collecting unit 30 via the information communication network N.

<Storage and Transmission of In-Vehicle Data in Information Collecting Unit>

Figure 4:
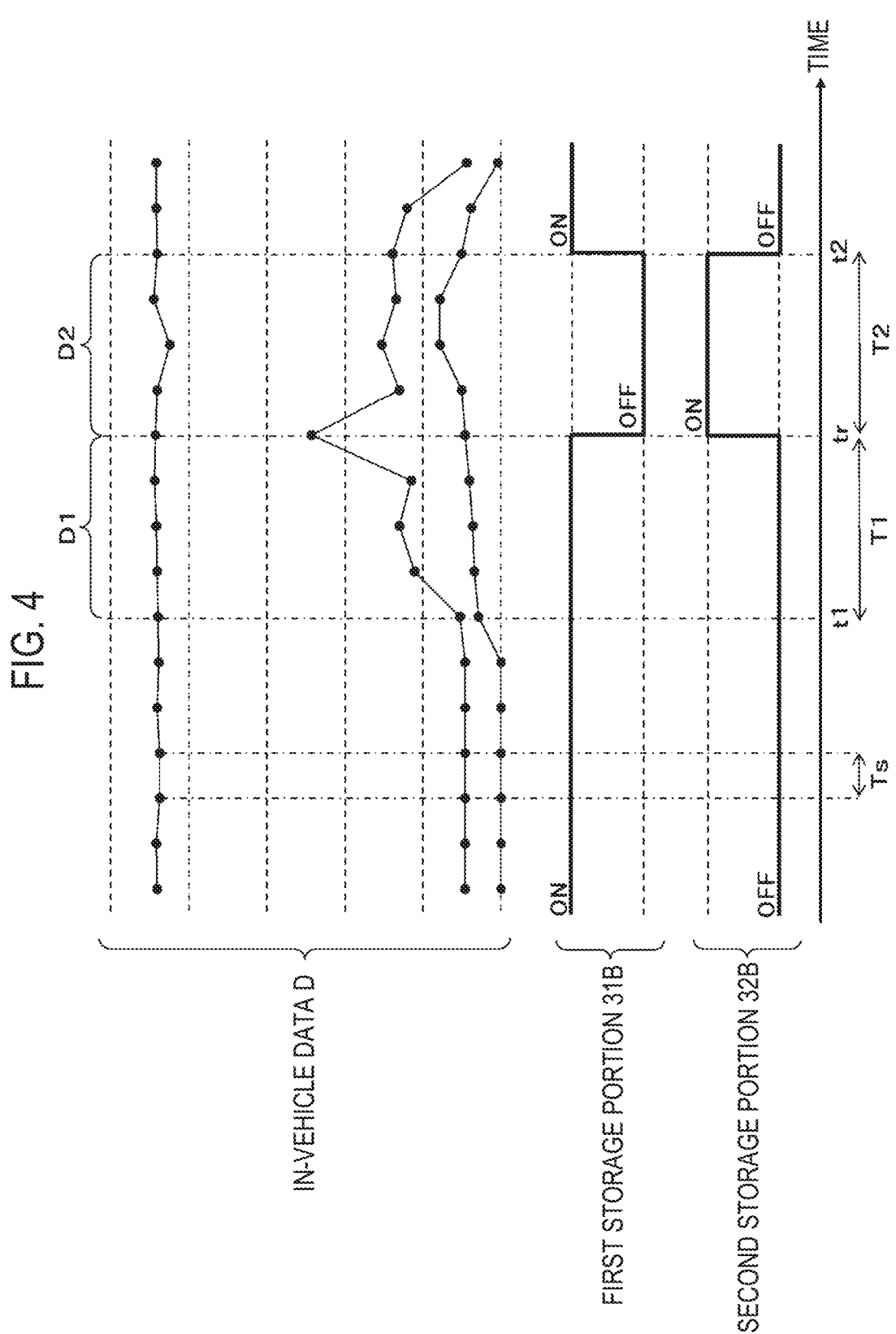
FIG. 4 is a time chart illustrating temporal changes of in-vehicle data configured of an output signal of an electronic device included in the backhoe illustrated in FIG. 1 and operations of a first storage portion and a second storage portion included in the backhoe.

As illustrated in FIG. 4, the output signal from the electronic device 7 is sampled at a sampling cycle Ts by the information collecting unit 30, and thus the in-vehicle data D is configured. In a case where the backhoe 1 is activated, output of a signal of the electronic device 7 and sampling are started and are continued at all times. Therefore, configuration of the in-vehicle data D is also continued at all times from the start of activation of the backhoe 1.

In a case where the backhoe 1 is activated, the first storage portion 31B stores the in-vehicle data D configured as described above, and storage in the second storage portion 32B is restricted. In the present embodiment, ring buffer processing is used for storage in the first storage portion 31B. In the time charts for the first storage portion 31B and the second storage portion 32B in FIG. 4, a state in which the storage process is executed is represented as "ON", and a state in which the storage process is restricted is represented as "OFF".

It is assumed that, after the backhoe 1 is activated, a request for transmission of the in-vehicle data is made from the terminal device 40, and the request timing tr arrives. In response to the transmission request from the terminal device 40, the storage parts are switched at the request timing tr. That is, at the request timing tr, the first storage portion 31B that has been set to "ON" is set to "OFF", and the second storage portion 32B that has been set to "OFF" is set to "ON". As a result, the in-vehicle data D is stored in the first storage portion 31B until the request timing tr, and the in-vehicle data D is stored in the second storage portion 32B after the request timing tr.

At the request timing tr, the range of the in-vehicle data is also transmitted together with the transmission request from the terminal device 40. That is, at the request timing tr, the information collecting unit 30 receives the first period T1 and the second period T2 input by the terminal device 40. In response to this, the communication device 30C transmits the in-vehicle data D1 in the range corresponding to the first period T1 (the range from the timing t1 to the request timing tr) among pieces of the in-vehicle data D stored in the first storage portion 31B to the terminal device 40. Here, the first period T1 is adjusted to be longer than the sampling cycle Ts.

In a case where the second period T2 has elapsed from the request timing tr (in a case where the timing t2 arrives), the first storage portion 31B that has been set to "OFF" returns to "ON", and the second storage portion 32B that has been set to "ON" is set to "OFF" again. As a result, during the second period T2 (a period to the timing t2) from the request timing tr, the in-vehicle data D is stored in the second storage portion 32B, and after the second period T2 has elapsed (after the timing t2), the storage of the in-vehicle data D in the first storage portion 31B is returned. The communication device 30C transmits the in-vehicle data D2 in the range corresponding to the second period T2 (the range from the request timing tr to the timing t2) among the pieces of in-vehicle data D stored in the second storage portion 32B to the terminal device 40. Here, the second period T2 is adjusted to be longer than the sampling cycle Ts.

As described above, among the pieces of in-vehicle data D, the in-vehicle data D1 and D2 in the range (the range from the timing t1 to the timing t2) corresponding to the first period T1 and the second period T2 with the request timing tr interposed therebetween are transmitted from the information collecting unit 30 to the terminal device 40 via the information communication network N. The transmitted in-vehicle data D1 and D2 in the range from t1 to t2 are processed into the visualized data VD by the terminal device 40 and displayed on the display device 41 (refer to FIG. 3).

<Actual Operation>

Figure 5:
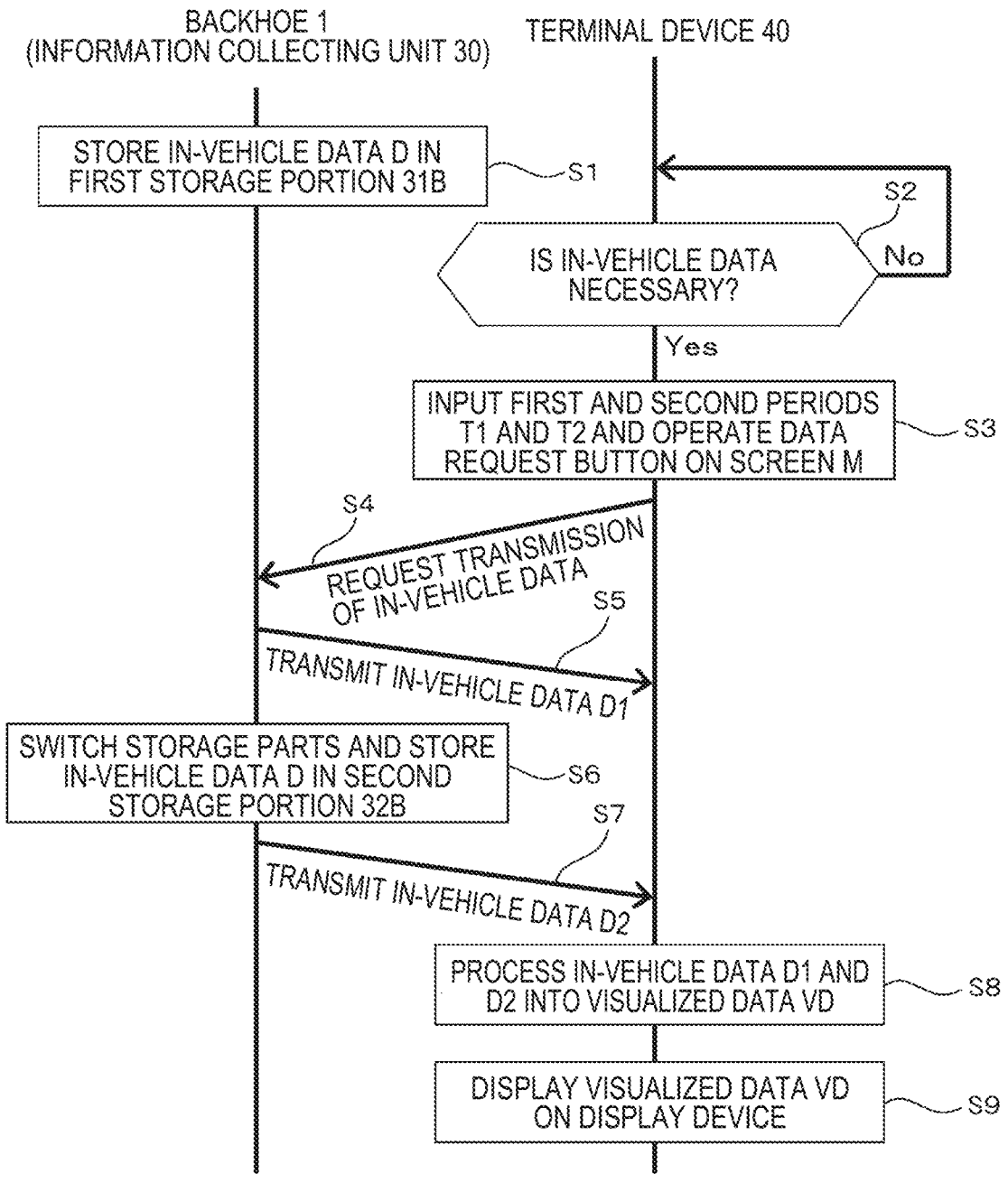
FIG. 5 is a flowchart illustrating a flow of data communication in the backhoe and the terminal device illustrated in FIG. 1.

FIG. 5 is a flowchart illustrating an operation of the communication system S of the industrial machine. It is assumed that the backhoe 1 is activated, and each of the information collecting unit 30 and the terminal device 40 are connected to the information communication network N and can perform data communication (refer to FIGS. 1 and 2).

The information collecting unit 30 samples an output signal from the electronic device 7 of the backhoe 1 such that the in-vehicle data D is configured, and the in-vehicle data D is stored in the first storage portion 31B (S1). In the terminal device 40, it is determined whether or not a status in which the in-vehicle data is necessary occurs (S2), and in a case where a determination result is "Yes", the first period T1 and the second period T2 are input through an operation on the screen M, and then the data request button 41A is operated (S3; refer to FIG. 3). As a result, a range of the in-vehicle data is set, and a request instruction is issued to the information collecting unit 30 to transmit the in-vehicle data in the range to the terminal device 40 (S4). In a case where a determination result is "No" in step S2, the process does not proceed to the next step.

In the information collecting unit 30, in response to the request from the terminal device 40, the in-vehicle data D1 in the range corresponding to the first period T1 among the pieces of in-vehicle data D stored in the first storage portion 31B is transmitted to the terminal device 40 (S5; refer to FIG. 4). At the same time, storage parts are switched at the request timing tr, and the in-vehicle data is stored in the second storage portion 32B (S6; refer to FIG. 4). In a case where the second period T2 has elapsed from the request timing tr, the in-vehicle data D2 in the range corresponding to the second period T2 among the pieces of in-vehicle data D stored in the second storage portion 32B is transmitted to the terminal device 40 (S7; refer to FIG. 4), and at the same time, storage parts are switched, and the in-vehicle data D is stored in the first storage portion 31B.

In the terminal device 40, the pieces of transmitted in-vehicle data D1 and D2 in the range corresponding to the first period T1 and the second period T2 are processed into the visualized data VD (S8), and the processed visualized data VD is displayed via the screen M of the display device 41 (S9; refer to FIG. 3).

Second Embodiment

In the first embodiment, the in-vehicle data stored in the storage device 30B is transmitted to the terminal device 40 in response to a request from the terminal device 40, and the range of the in-vehicle data to be transmitted can be changed by the terminal device 40. In the communication system S of the industrial machine according to a second embodiment of the present invention, in-vehicle data stored in the storage device 30B is transmitted to the terminal device 40 every predetermined time. The second embodiment is different from the first embodiment only in this point. Differences between the first embodiment and the second embodiment will be described below.

In the second embodiment, the communication device 30C of the information collecting unit 30 transmits the in-vehicle data D1 and D2 stored in the storage device 30B (the first storage portion 31B and the second storage portion 32B) to the terminal device 40 via the information communication network N every predetermined time Tp. In the second embodiment, the predetermined time Tp is set and stored in advance in the information collecting unit 30, a timing tp arrives at each predetermined time Tp, and transmission of the in-vehicle data is executed at each timing tp.

Figure 6:
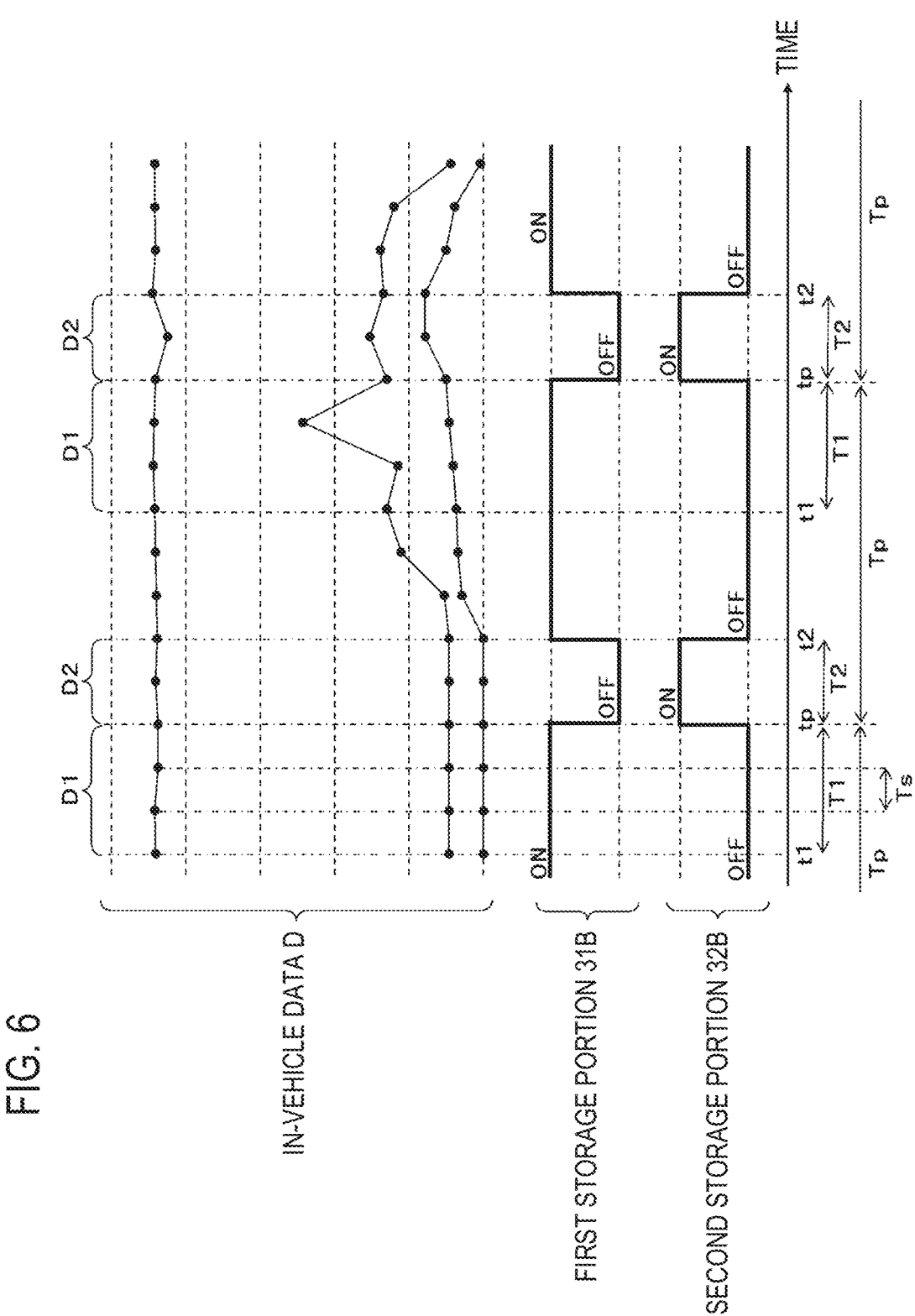
FIG. 6 is a time chart illustrating temporal changes of in-vehicle data configured of an output signal of an electronic device included in a backhoe in a communication system of an industrial machine (backhoe) according to a second embodiment of the present invention, and operations of a first storage portion and a second storage portion included in the backhoe.

As illustrated in FIG. 6, in the second embodiment, in a case where the timing tp arrives after the backhoe 1 is activated, the first storage portion 31B that has been set to "ON" is set to "OFF", and the second storage portion 32B that has been set to "OFF" is set to "ON". As a result, the in-vehicle data D is stored in the first storage portion 31B until the timing tp, and the in-vehicle data D is stored in the second storage portion 32B after the timing tp.

In the second embodiment, the first period T1 is a period from a timing t1 before the timing tp to the timing tp. The second period T2 is a period from the timing tp to a timing t2 after the timing tp. In the second embodiment, the first period T1 (timing t1) and the second period T2 (timing t2) are set and stored in advance in the information collecting unit 30 instead of being set in the terminal device 40.

At the timing tp, the communication device 30C transmits, to the terminal device 40, the in-vehicle data D1 in the range (the range from the timing t1 to the timing tp) corresponding to the first period T1 among the pieces of in-vehicle data D stored in the first storage portion 31B.

In a case where the second period T2 has elapsed from the timing tp (in a case where the timing t2 arrives), the first storage portion 31B that has been set to "OFF" returns to "ON", and the second storage portion 32B that has been set to "ON" is set to "OFF" again. As a result, in the second period T2 (the period to the timing t2) from the timing tp, the in-vehicle data D is stored in the second storage portion 32B, and after the second period T2 has elapsed (after the timing t2), the storage of the in-vehicle data D in the first storage portion 31B is returned. The communication device 30C transmits the in-vehicle data D2 in the range corresponding to the second period T2 (the range from the request timing tr to the timing t2) among the pieces of in-vehicle data D stored in the second storage portion 32B to the terminal device 40.

Thereafter, every time the timing tp arrives after the predetermined time Tp elapses, the above-described switching between the storage parts and transmission process of the in-vehicle data D1 and D2 are executed. In the second embodiment, the predetermined time Tp is adjusted to be longer than either the first period T1 or the second period T2. Both the first period T1 and the second period T2 are adjusted to be longer than the sampling cycle Ts.

As described above, among the pieces of in-vehicle data D, the pieces of in-vehicle data D1 and D2 in the range (the range from the timing t1 to the timing t2) corresponding to the first period T1 and the second period T2 with the timing tp interposed therebetween are transmitted from the information collecting unit 30 to the terminal device 40 via the information communication network N every predetermined time Tp. The transmitted in-vehicle data D1 and D2 in the range from t1 to t2 are processed into the visualized data VD by the terminal device 40 and displayed on the display device 41. The display of the visualized data VD on the display device 41 is updated every predetermined time Tp in accordance with the transmission of the in-vehicle data D1 and D2 every predetermined time Tp.

Figure 7:
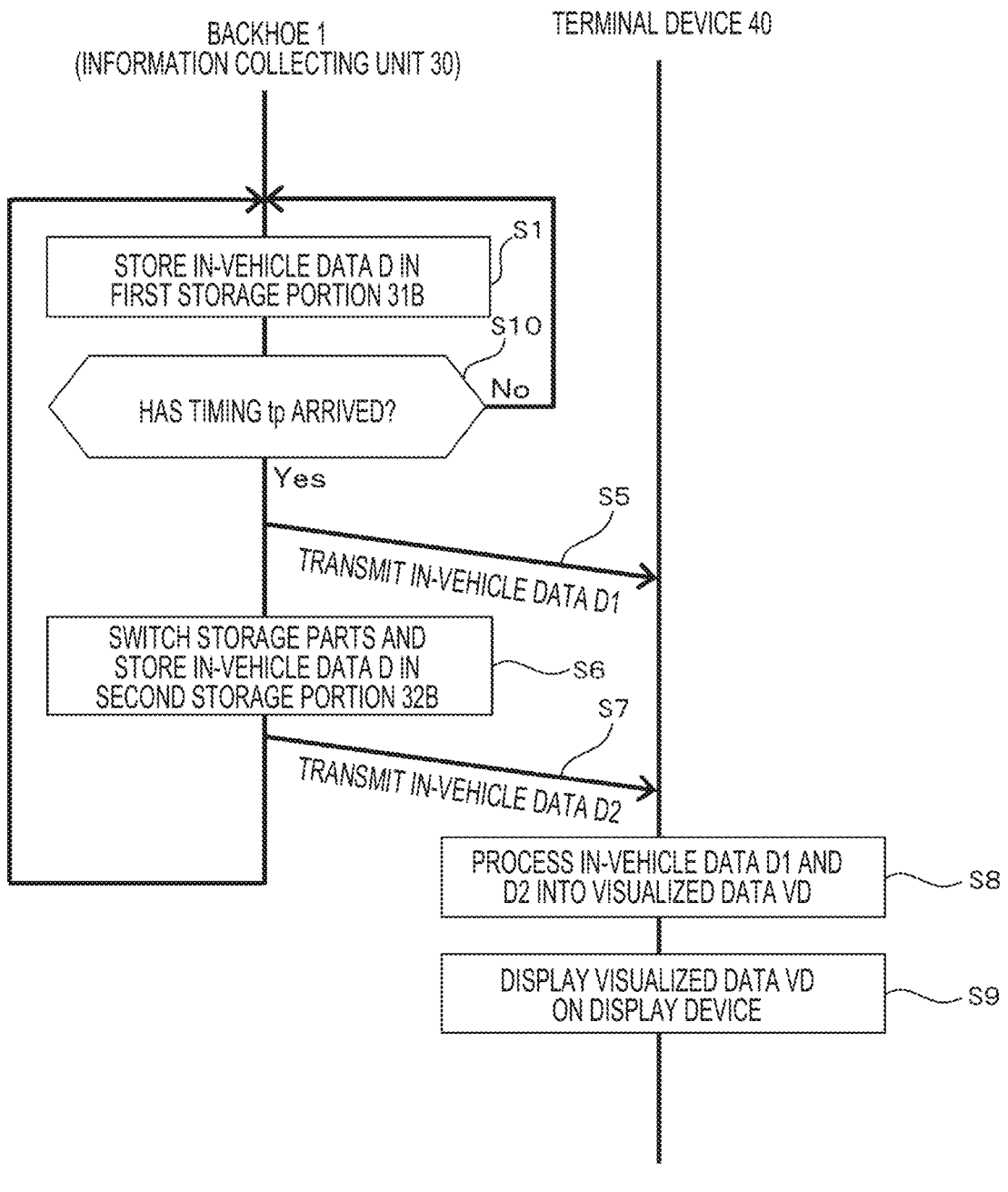
FIG. 7 is a flowchart illustrating a flow of data communication in the backhoe and a terminal device in the communication system of the industrial machine (backhoe) according to the second embodiment of the present invention.

As illustrated in FIG. 7, in the flowchart illustrating the operation of the second embodiment, steps S2, S3, and S4 in FIG. 5 are deleted, and step S10 is newly added between steps S1 and S5. The information collecting unit 30 returns to step S1 after steps S6 and S7.

After the backhoe 1 is activated, the information collecting unit 30 stores the in-vehicle data D in the first storage portion 31B (S1), and determines whether the timing tp has arrived, that is, whether the predetermined time Tp has elapsed from the arrival of the previous timing tp (S10). In a case where a determination result is "Yes", the in-vehicle data D1 in the range corresponding to the first period T1 among the pieces of in-vehicle data D stored in the first storage portion 31B is transmitted to the terminal device 40 (S5; refer to FIG. 6). At the same time, storage parts are switched at the timing tp, and the in-vehicle data is stored in the second storage portion 32B (S6; refer to FIG. 6).

In a case where the second period T2 has elapsed from the timing tp, the in-vehicle data D2 in the range corresponding to the second period T2 among the pieces of in-vehicle data D stored in the second storage portion 32B is transmitted to the terminal device 40 (S7; refer to FIG. 6), and the process returns to step S1, and the above-described processes are repeatedly performed. In a case where a determination result is "No" in step S10, the processes in steps S1 and S10 are repeatedly performed unless a determination result is "Yes".

The pieces of in-vehicle data D1 and D2 in the range corresponding to the first period T1 and the second period T2 transmitted in steps S5 and S7 are processed into the visualized data VD by the terminal device 40 (S8), and the processed visualized data VD is displayed via the screen M of the display device 41 (S9; refer to FIG. 3).

Summary

As described above, the communication system S of the industrial machine according to the embodiment of the present invention includes the in-vehicle network N1, the information communication network N, and the communication device 30C of the information collecting unit 30. The in-vehicle network N1 performs data communication in a plurality of electronic devices 7 mounted on the industrial machine (backhoe 1). The information communication network N is an external network of the industrial machine (backhoe 1), and is a network different from the in-vehicle network N1. The communication device 30C connects the in-vehicle network N1 to the information communication network N. The communication device 30C transmits the in-vehicle data D when data communication is performed by the plurality of electronic devices 7 in the in-vehicle network N1 to the information communication network N.

Accordingly, the in-vehicle data D configured via the in-vehicle network N1 in the backhoe 1 can be transmitted without any change to the information communication network N outside the backhoe 1. Therefore, the in-vehicle data D transmitted to the information communication network N is, for example, a graph corresponding to an output signal from the electronic device 7, and can be generates as a graph indicating a continuous temporal change for each sampling cycle. The in-vehicle data D is used outside the backhoe 1, and a change tendency or the like of the in-vehicle data D can be appropriately analyzed. Therefore, diagnosis of a part corresponding to the electronic device 7 can be easily and accurately executed at a place remote from the backhoe 1.

Examples of the place remote from the backhoe 1 include a rental company, a repair company, and a manufacturer. It is possible to promptly proceed with determination of repair details, arrangement of components, arrangement of an alternative machine, and the like on the basis of a diagnosis result without going to a place where the actual object of the backhoe 1 is located from such a place. As a result, a service can be improved.

The communication system S of the industrial machine includes the terminal device 40. The terminal device 40 can be connected to the information communication network N. The communication device 30C transmits the in-vehicle data D to the terminal device 40 via the information communication network N. The terminal device 40 processes the in-vehicle data D transmitted by the communication device 30C into the visualized data VD. According to this, the terminal device 40 can be located at a place remote from the backhoe 1, and the terminal device 40 can process the in-vehicle data D into the visualized data VD. Therefore, a change tendency and the like can be appropriately and reliably analyzed by visually recognizing the visualized data VD at a place remote from the backhoe 1.

The communication system S of the industrial machine includes the display device 41. The display device 41 displays the visualized data VD processed by the terminal device 40. According to this, the display device 41 can be located at a place remote from the backhoe 1, and the visualized data VD can be displayed on the display device 41. Therefore, the visualized data VD can be visually recognized more reliably at a place remote from the backhoe 1.

The communication system S of the industrial machine includes the storage device 30B. The storage device 30B temporarily stores the in-vehicle data D before the communication device 30C transmits the in-vehicle data D to the information communication network N. The terminal device 40 requests the communication device 30C to transmit the in-vehicle data D to the terminal device 40 via the information communication network N. The communication device 30C transmits the in-vehicle data D stored in the storage device 30B to the terminal device 40 via the information communication network N in response to the request from the terminal device 40.

According to this, the in-vehicle data D can be stored in the storage device 30B prior to a request from the terminal device 40. Therefore, when there is a request from the terminal device 40, for example, the in-vehicle data D before and after the request timing tr, such as the in-vehicle data D1 in the first period T1 before the request timing tr and the in-vehicle data D2 in the second period T2 after the request timing tr, can be transmitted to the terminal device 40. Therefore, in the terminal device 40, the in-vehicle data D before and after the request timing tr can be used for analysis, and diagnosis of a part corresponding to the electronic device 7 can be executed more accurately.

The communication system S of the industrial machine includes the storage device 30B. The storage device 30B temporarily stores the in-vehicle data D before the communication device 30C transmits the in-vehicle data D to the information communication network N. The communication device 30C transmits the in-vehicle data D stored in the storage device 30B to the terminal device 40 via the information communication network N every predetermined time Tp. According to this, the terminal device 40 can analyze the in-vehicle data D every predetermined time Tp. Therefore, diagnosis of a part corresponding to the electronic device 7 can be executed at a desired timing by adjusting the predetermined time Tp.

The communication system S of the industrial machine includes the storage device 30B. The storage device 30B temporarily stores the in-vehicle data D before the communication device 30C transmits the in-vehicle data D to the information communication network N. The terminal device 40 changes a range of the in-vehicle data D to be transmitted to the information communication network N by the communication device 30C among the pieces of in-vehicle data D stored in the storage device 30B. According to this, the terminal device 40 can change a range of the in-vehicle data D to be transmitted to the terminal device 40. Therefore, in the terminal device 40, a range of the in-vehicle data D used for analysis can be adjusted as necessary, and diagnosis of a part corresponding to the electronic device 7 can be executed more accurately.

The industrial machine (backhoe 1) includes the in-vehicle network N1 and the communication device 30C of the information collecting unit 30. The communication device 30C transmits the in-vehicle data D when data communication is performed by the plurality of electronic devices 7 in the in-vehicle network N1 to the information communication network N. This also makes it possible to easily and accurately diagnose a part corresponding to the electronic device 7 at a place remote from the backhoe 1.

Modified Examples

In the first embodiment, the in-vehicle data stored in the storage device 30B is transmitted to the terminal device 40 in response to a request from the terminal device 40, and the range of the in-vehicle data to be transmitted can be changed by the terminal device 40. Alternatively, for example, a range of the in-vehicle data may not be changed while a request instruction is issued from the terminal device 40, or the range of the in-vehicle data may be changed from the terminal device 40 while the request instruction is not issued.

In the second embodiment, the in-vehicle data stored in the storage device 30B is transmitted to the terminal device 40 to fall within a preset range every preset predetermined time Tp. Alternatively, the predetermined time Tp may be changeable by the terminal device 40, or a range of the in-vehicle data may be changeable by the terminal device 40.

In the first embodiment, the in-vehicle data stored in the storage device 30B is transmitted to the terminal device 40 in response to a request from the terminal device 40. In the second embodiment, the in-vehicle data stored in the storage device 30B is transmitted to the terminal device 40 every predetermined time Tp set in advance. However, a transmission start condition for the in-vehicle data is not limited to these conditions, and the transmission of the in-vehicle data may be started in a case where a predetermined transmission start condition occurs. Examples of the predetermined transmission start condition include, in addition to acquisition of a request from the terminal device 40 and arrival of the predetermined time Tp described above, the occurrence of a predetermined error condition (for example, abnormality detection using various sensors provided in the backhoe 1 and abnormal stop of a device), arrival of a predetermined transmission time (for example, arrival of a predetermined time point and elapse of a predetermined operating time), and detection of a predetermined operation input.

It should be understood that the embodiments disclosed herein are illustrative in all respects and not restrictive. The scope of the present invention is shown not by the above description but by the claims, and it is intended that meanings equivalent to the claims and all modifications within the scope are included.

What is claimed is:

1. A communication system of an industrial machine, comprising:

an in-vehicle network that performs data communication between a plurality of devices mounted on an industrial machine;

an information communication network that is an external network of the industrial machine and is different from the in-vehicle network;

a communication device that connects the in-vehicle network to the information communication network;

a terminal device that is connectable to the information communication network, and a storage device that temporarily stores the in-vehicle data before the communication device transmits the in-vehicle data to the information communication network, wherein the communication device transmits, to the information communication network, in-vehicle data when the data communication is performed between the plurality of devices in the in-vehicle network, the communication device transmits the in-vehicle data to the terminal device via the information communication network, the terminal device processes the in-vehicle data transmitted by the communication device into visualized data, and the communication device transmits the in-vehicle data stored in the storage device to the terminal device via the information communication network in a case where a predetermined transmission start condition occurs.

2. The communication system of an industrial machine according to claim 1, further comprising:

a display device that displays the visualized data processed by the terminal device.

3. The communication system of an industrial machine according to claim 1, further comprising:

a storage device that temporarily stores the in-vehicle data before the communication device transmits the in-vehicle data to the information communication network, wherein the terminal device requests the communication device to transmit the in-vehicle data to the terminal device via the information communication network, and the communication device transmits the in-vehicle data stored in the storage device to the terminal device via the information communication network in response to a request from the terminal device.

4. A communication system of an industrial machine, comprising:

an in-vehicle network that performs data communication between a plurality of devices mounted on an industrial machine;

an information communication network that is an external network of the industrial machine and is different from the in-vehicle network;

a communication device that connects the in-vehicle network to the information communication network; and a terminal device that is connectable to the information communication network, wherein the communication device transmits, to the information communication network, in-vehicle data when the data communication is performed between the plurality of devices in the in-vehicle network, the communication device transmits the in-vehicle data to the terminal device via the information communication network, the terminal device processes the in-vehicle data transmitted by the communication device into visualized data, further comprising:

a storage device that temporarily stores the in-vehicle data before the communication device transmits the in-vehicle data to the information communication network, wherein a range of in-vehicle data to be transmitted to the information communication network by the communication device among pieces of the in-vehicle data stored in the storage device is changeable by the terminal device.

5. An industrial machine comprising:

an in-vehicle network that performs data communication between a plurality of devices mounted on the industrial machine; and a communication device that connects the in-vehicle network to an information communication network that is an external network of the industrial machine and is different from the in-vehicle network, a terminal device that is connectable to the information communication network, and a storage device that temporarily stores the in-vehicle data before the communication device transmits the in-vehicle data to the information communication network, wherein the communication device transmits, to the information communication network, in-vehicle data when the data communication is performed between the plurality of devices in the in-vehicle network, the communication device transmits the in-vehicle data to the terminal device via the information communication network, the terminal device processes the in-vehicle data transmitted by the communication device into visualized data, and the communication device transmits the in-vehicle data stored in the storage device to the terminal device via the information communication network in a case where a predetermined transmission start condition occurs.

* * * * *